(12) United States Patent
Behzad et al.

(10) Patent No.: US 8,266,468 B2
(45) Date of Patent: *Sep. 11, 2012

(54) INTEGRATED CIRCUIT WITH INTERPOLATION TO AVOID HARMONIC INTERFERENCE

(75) Inventors: Arya Reza Behzad, Poway, CA (US); Mark Gonikberg, Los Altos Hills, CA (US); Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 12/899,256

(22) Filed: Oct. 6, 2010

(65) Prior Publication Data

US 2011/0022875 A1    Jan. 27, 2011

Related U.S. Application Data

(63) Continuation of application No. 11/800,208, filed on May 4, 2007, now Pat. No. 7,827,430, which is a continuation-in-part of application No. 11/494,147, filed on Jul. 26, 2006, now Pat. No. 7,793,132.

(60) Provisional application No. 60/868,818, filed on Dec. 6, 2006, provisional application No. 60/868,881, filed on Dec. 6, 2006, provisional application No. 60/868,878, filed on Dec. 6, 2006.

(51) Int. Cl.
| | | |
|---|---|---|
| *G06F 1/00* | (2006.01) | |
| *G06F 1/04* | (2006.01) | |
| *G06F 3/033* | (2006.01) | |
| *H03L 7/02* | (2006.01) | |
| *H03K 3/03* | (2006.01) | |
| *H03K 19/00* | (2006.01) | |
| *H03K 5/01* | (2006.01) | |
| *H03K 9/00* | (2006.01) | |
| *H04L 7/00* | (2006.01) | |

(52) U.S. Cl. ........... 713/500; 713/600; 331/1 R; 331/46; 326/93; 327/100; 375/316; 375/354; 455/130

(58) Field of Classification Search .................. 713/500, 713/600; 331/1 R, 46; 326/93; 327/100; 375/316, 354; 455/130

See application file for complete search history.

(56) References Cited

U.S. PATENT DOCUMENTS

| | | | | |
|---|---|---|---|---|
| 6,201,431 | B1 * | 3/2001 | Allen et al. .................... | 327/379 |
| 6,999,723 | B2 * | 2/2006 | Kusbel et al. ................ | 455/63.1 |
| 7,279,989 | B2 * | 10/2007 | Bettner et al. ................. | 331/16 |
| 7,634,028 | B2 * | 12/2009 | Crawley ........................ | 375/326 |

* cited by examiner

*Primary Examiner* — Stefan Stoynov

(74) *Attorney, Agent, or Firm* — Garlick & Markison; Holly L. Rudnick

(57) ABSTRACT

An integrated circuit (IC) includes a clock circuit, a processing module, and processing circuitry. The clock circuit is coupled to produce a digital clock signal. The processing module is coupled to determine whether a harmonic component of the digital clock signal having a nominal digital clock rate is within the frequency passband and to provide an indication to the clock circuit to adjust its rate from the nominal digital clock rate to an adjusted digital clock rate when the harmonic component of the digital clock signal is within the frequency passband. The processing circuitry is coupled to process, at the adjusted digital clock rate, the data to produce processed data having a rate corresponding to the nominal digital clock rate and to interpolate, at an interpolation rate, the processed data to produce interpolated processed data having a rate corresponding to the interpolation rate.

20 Claims, 12 Drawing Sheets

INTEGRATED CIRCUIT WITH INTERPOLATION TO AVOID HARMONIC INTERFERENCE

CROSS REFERENCE TO RELATED PATENTS

The present U.S. Utility Patent Application claims priority pursuant to 35 U.S.C. §120, as a continuation, to U.S. Utility application Ser. No. 11/800,208, now U.S. Pat. No. 7,827,430, entitled "INTEGRATED CIRCUIT WITH INTERPOLATION TO AVOID HARMONIC INTERFERENCE," filed May 4, 2007, which claims priority pursuant to 35 U.S.C. §120, as a continuation-in-part (CIP), to U.S. Utility application Ser. No. 11/494,147, entitled "INTEGRATED CIRCUIT HAVING FREQUENCY DEPENDENT NOISE AVOIDANCE, filed Jul. 26, 2006, now U.S. Pat. No. 7,793,132. U.S. Utility application Ser. No. 11/800,208 also claims priority pursuant to 35 U.S.C. §119(e) to the following U.S. Provisional Patent Applications:

1. U.S. Provisional Application Ser. No. 60/868,818, entitled "METHOD AND SYSTEM FOR SIGNAL PROCESSING IN WIRELESS COMMUNICATIONS," filed Dec. 6, 2006, expired;

2. U.S. Provisional Application Ser. No. 60/868,881, entitled "FUNCTIONALITIES OF A CHIP," filed Dec. 6, 2006, expired; and 3. U.S. Provisional Application Ser. No. 60/868,878, entitled "METHOD AND SYSTEM FOR SIGNAL PROCESSING," filed Dec. 6, 2006, expired;

all of which are incorporated herein by reference in their entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

This invention relates generally to integrated circuits and more particularly to noise avoidance within integrated circuits.

DESCRIPTION OF RELATED ART

As is known, integrated circuits are used in a wide variety of products including, but certainly not limited to, portable electronic devices, computers, computer networking equipment, home entertainment, automotive controls and features, and home appliances. As is also known, integrated circuits include a plurality of circuits in a very small space to perform one or more fixed or programmable functions.

Many integrated circuits include circuitry that is sensitive to noise and circuitry that produces noise. For example, a radio frequency integrated circuit (RFIC), which may be used in a cellular telephone, wireless local area network (WLAN) interface, broadcast radio receiver, two-way radio, etc., includes a low noise amplifier (LNA) that is susceptible to adverse performance due to noise and also includes an analog to digital converter and other digital circuitry that produce noise. To prevent the noise from adversely affecting the noise sensitive circuits (e.g., the LNA) many noise reduction concepts have been developed.

The simplest noise reduction concept is to put noise sensitive circuits on a different IC die than noise producing circuits. While this solves the noise sensitivity issue, it does not provide the reduction in form factor that many products and/or devices are required to have. Another technique is to have the noise sensitive circuits on separate power supply lines (e.g., positive rail, negative rail, and/or return) and connected together off-chip.

Yet another technique for radio frequency receivers involves tracking the noise (which may include harmonics of the digital clock(s) of the baseband circuitry, the digital to analog converter, and/or the analog to digital converter falling in a frequency band of interest for the receiver) in the baseband processing and attempting to digitally cancel it. Such a solution was difficult to implement and its effectiveness was marginal. Other techniques include layout management, shielding, a different clock rate, etc.

While each of these techniques provides varying levels of noise management, their effectiveness is reduced as the fabrication process of integrated circuit shrink and/or as more circuits are placed on the same integrated circuit die. Therefore, a need exists for an integrated circuit that reduces the adverse affects of noise, which may include harmonics of on-chip digital circuitry.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
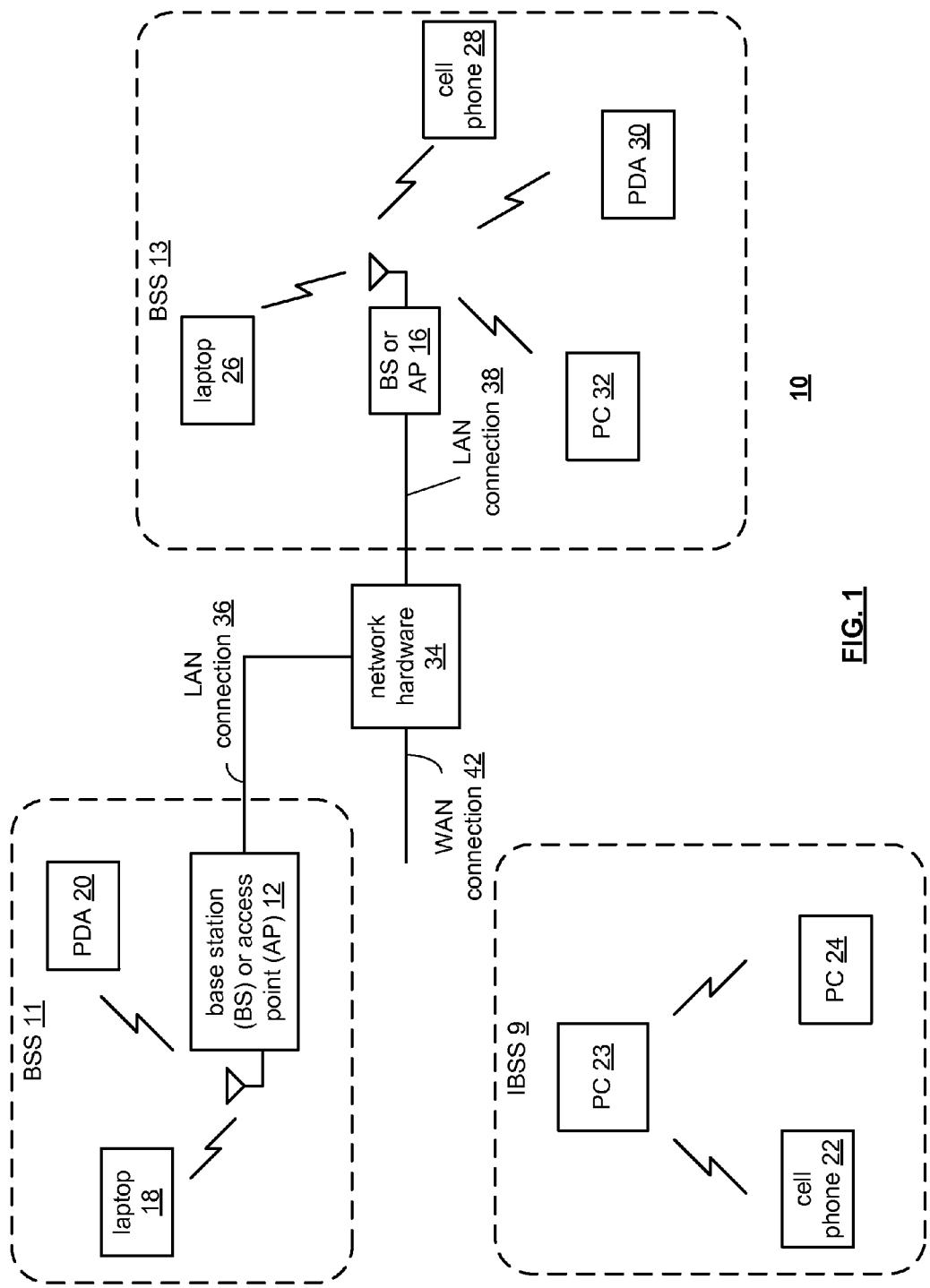
FIG. 1 is a schematic block diagram of an embodiment of wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIGS. 2-13.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio.

Figure 2:
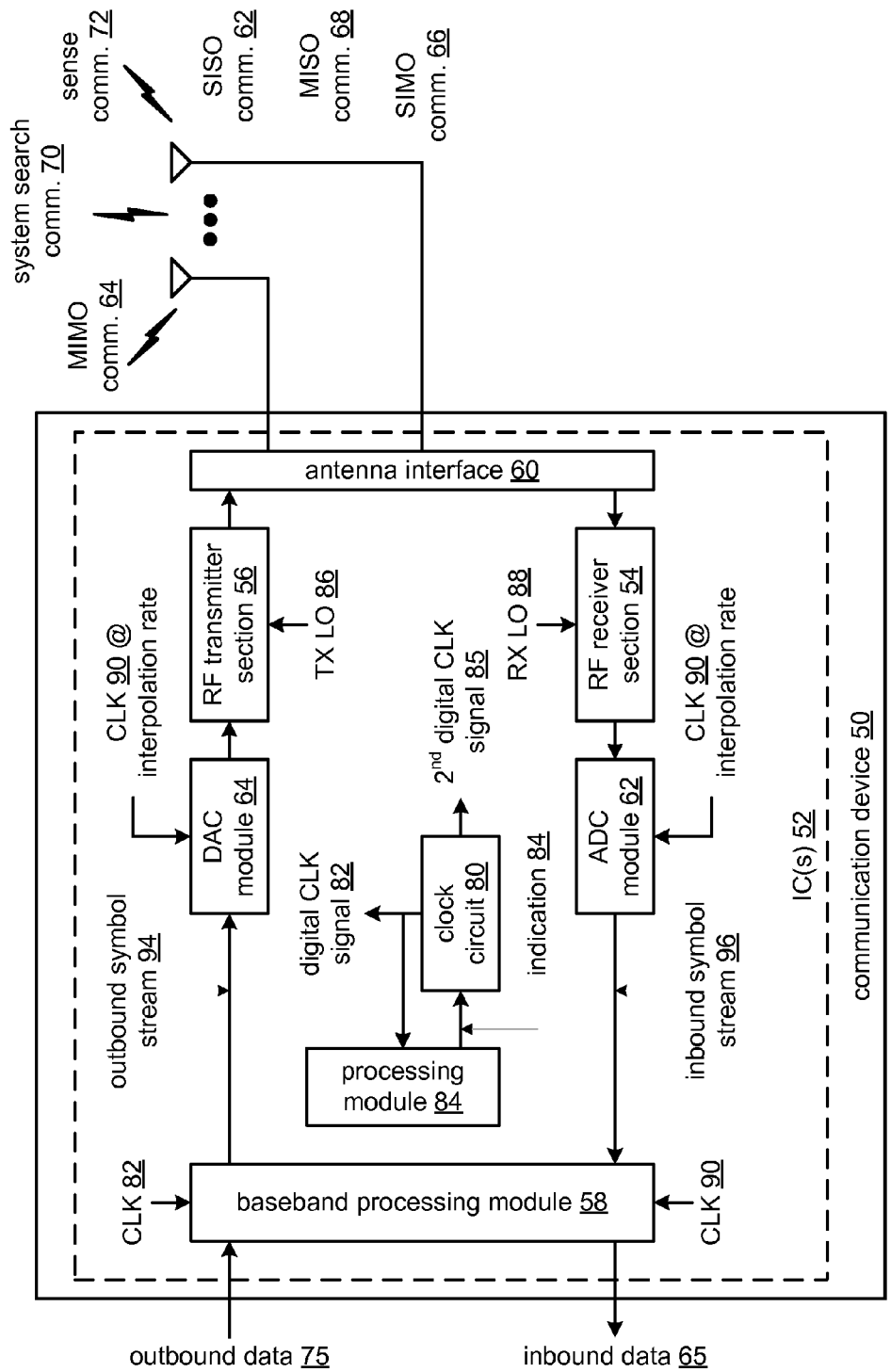
FIG. 2 is a schematic block diagram of an embodiment of wireless communication device in accordance with the present invention.

FIG. 2 is a schematic block diagram of an embodiment of wireless communication device 50, which may be one of the communication devices 18-32 of FIG. 1 or may be another type of wireless communication device. The wireless communication device 50 includes one or more circuits and/or integrated circuit (IC) 52 coupled to an antenna system. The one or more ICs 52 includes a radio frequency (RF) receiver section 54, an RF transmitter section 56, a baseband processing module 58, an antenna interface 60, an analog to digital conversion (ADC) module 62, a digital to analog conversion (DAC) module 64, a clock circuit 80, and a processing module 84. The antenna system may include one or more antennas to provide a diversity antenna structure, to provide an in-air beamforming structure, to provide a polarized antenna structure, to provide a multiple input multiple output (MIMO) communication 64 antenna structure, to provide a single input single output (SISO) communication 62 antenna structure, to provide a single input multiple output (SIMO) communication 66 antenna structure, to provide a multiple input single output (MISO0 communication 68 antenna structure, to provide a system search communication 70 (e.g., attempting authorization and/or association with a system) antenna structure, and/or to provide carrier sense communication 72 (e.g., detect an incoming wireless communication) antenna system.

The baseband processing module 58 and the processing module 84 may be separate processing modules or a common processing module. Whether separate or shared, a processing module 58 and/or 84 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 2-13.

The baseband processing module 58 converts outbound data 75 (e.g., a voice signal, data, a text file, an audio file, a video file, an image file, and/or a combination thereof) into an outbound symbol stream 94 in accordance with a wireless communication protocol (e.g., IEEE 802.11 a, b, g, n, etc., Bluetooth, ZigBee, GSM, CDMA, WCDMA, EDGE, GPRS, HSDPA, HSUPA, etc.). The baseband processing module 58 also converts an inbound symbol stream 96 into inbound data 65 (e.g., a voice signal, data, a text file, an audio file, a video file, an image file, and/or a combination thereof).

The DAC module 64, which may include one or mode digital to analog converters, converts the outbound symbol stream 94 into an analog outbound symbol stream. The RF transmitter section 56, an embodiment of which will be described in greater detail with reference to FIG. 3, converts the analog outbound symbol stream into an outbound RF signal based on a transmit local oscillation 86.

The RF receiver section 54, an embodiment of which will be described in greater detail with reference to FIG. 3, converts an inbound RF signal into an analog inbound symbol stream based on a receive local oscillation 88. The ADC module, 62, which may include one or more analog to digital converters, converts the analog inbound symbol stream into the inbound symbol stream 96.

In an embodiment, the baseband processing module 58 may have a nominal rate for processing the inbound and outbound data 65 and 75, which may be prescribed by the wireless communication standard. For example, the nominal rate may correspond to processing $2^n$-bit words at 40 Megawords per second, wherein n may range from 0 to 10. For this example, it would be desirable to have the digital circuitry of the baseband processing module 58, as well as the digital circuitry of the ADC module 62 and of the DAC module 64 clocked by a 40 MHz clock or some multiple thereof. In furtherance of this example, assume that the inbound and outbound RF signals have a frequency passband corresponding to the seventh channel (e.g., a 20 MHz channel centered at 2.442 GHz having a pass band of 2.432 GHz to 2.452 GHz) of a 2.4 GHz frequency band of the IEEE 802.11(g) wireless communication standard.

Figure 4:
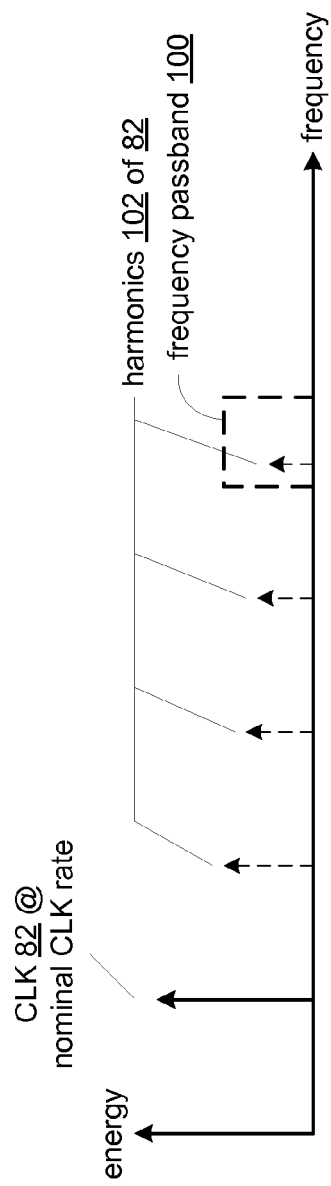
FIGS. 4 and 5 are diagrams of an example of harmonic noise and clock rate adjustment in accordance with the present invention.

In this example and with reference to FIG. 4, if the clock signal 82 has a nominal rate of 40 MHz, the $61^{st}$ harmonic 102 is 2.440 GHz (e.g., 61*40 MHz), which is within the frequency pass band 100 (e.g., 2.432 GHz to 2.452 GHz) of the seventh channel. To avoid this harmonic from interfering with the processing of the inbound and/or outbound RF signals, the processing module 84 provides an indication to the clock circuit 80 to adjust the rate of the digital clock signal 82 from the nominal digital clock rate (e.g., 40 MHz) to an adjusted digital clock rate (e.g., 41 MHz or 44 MHz).

Figure 5:
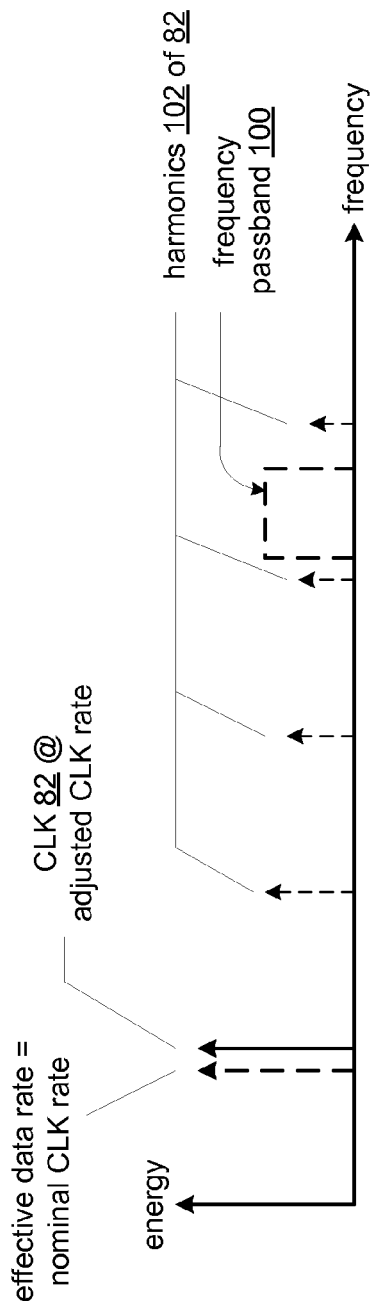

With reference to FIG. 5, if the clock signal 82 adjusts its rate to 41 MHz, the $59^{th}$ harmonic 102 is at 2.419 GHz (e.g., 59*41 MHz) and the $60^{th}$ harmonic 102 is at 2.460 GHz (e.g., 60*41 MHz), both harmonics are outside of the pass band 100 of the seventh channel band (e.g., 2.432 GHz to 2.452 GHz). As another example, if the clock signal 82 adjusts its rate to 44 MHz, the $55^{th}$ harmonic 102 is at 2.420 GHz (e.g., 55*44 MHz) and the $56^{th}$ harmonic 102 is at 2.464 GHz (e.g., 56*44 MHz), both of which are outside of the frequency pass band 100 of the seventh channel (e.g., 2.432 GHz to 2.452 GHz). As an extension of this example, the clock circuit 80 generates clock signal 82 to have a rate of 41 MHz and generates a second clock signal 85 to have a clock rate of 44 MHz.

Returning to the discussion of FIG. 2, the digital circuitry of the baseband processing module 58, of the ADC module 62, or of the DAC module 64 may be clocked by a 41 MHz clock signal and/or a 44 MHz clock signal to avoid the harmonic interference. As a furtherance of this example, the digital portions of the ADC module 62 and of the DAC module 64 may be clocked by the 41 MHz clock signal (e.g., an interpolation rate) and the digital circuitry of the baseband processing module 58 is clocked by the 44 MHz clock (e.g., an adjusted digital clock rate). However, it is still desirable to process the inbound and outbound data 65 and 75 at the nominal clock rate (e.g., 40 MHz).

To accommodate the nominal clock rate processing of the inbound and outbound data 65 and 75, the baseband processing module 58 interpolates, in accordance with the interpolation rate (e.g., is clocked by the 41 MHz clock rate or by the 44 MHz clock rate), the inbound symbol stream 96 to produce interpolated inbound data having a rate corresponding to the nominal digital clock rate. The baseband processing module 58 then demodulates, in accordance with the adjusted digital clock rate (e.g., is clocked by the 41 MHz clock rate or by the 44 MHz clock rate), the interpolated inbound data at the nominal digital clock rate (which may be engineered from the adjusted clock signal 82 or 85 or by suppressing extra samples) to produce the inbound data 65 having a rate (e.g., $2^n$ bits per 40 MHz) corresponding to the nominal digital clock rate.

For the outbound data 75, the baseband processing module 58 modulates, in accordance with the adjusted digital clock rate (e.g., the 41 MHz clock rate or the 44 MHz clock rate), the outbound data 75 at the nominal digital clock rate (which may be engineered from the adjusted clock signal or by suppressing extra samples) to produce modulated outbound data having a rate corresponding to the nominal digital clock rate. The baseband processing module 58 then interpolates, in accordance with the interpolation rate (e.g., the 41 MHz clock rate or the 44 MHz clock rate), the modulated outbound data to produce the outbound symbol stream 94 having a rate corresponding to the interpolation rate.

Figure 3:
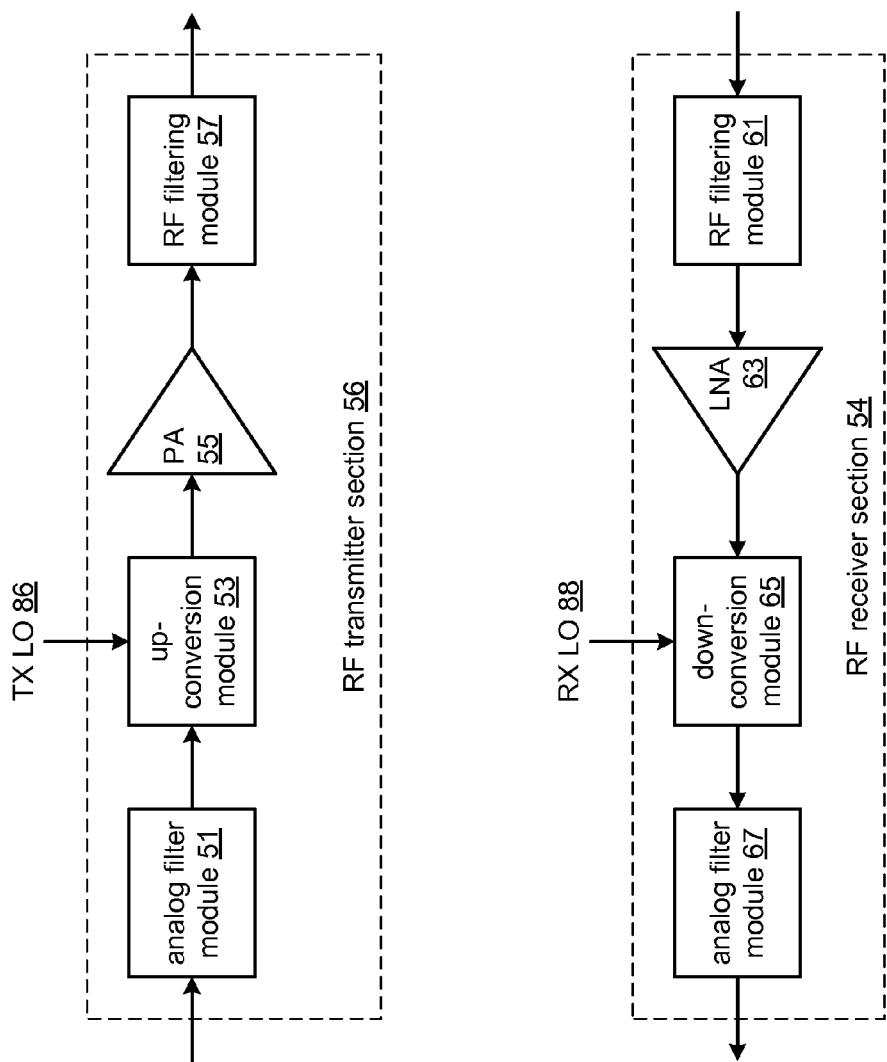
FIG. 3 is a schematic block diagram of an embodiment of a radio frequency (RF) transceiver in accordance with the present invention.

FIG. 3 is a schematic block diagram of an embodiment of a radio frequency (RF) transceiver that includes the RF receiver section 54 and the RF transmitter section 56. The RF receiver section 54 includes an RF filtering module 61, a low noise amplifier (LNA) module 63, a down conversion module 65, and an analog filter module 67. The RF transmitter section 56 includes an analog filter module 51, an up-conversion module 53, a power amplifier (PA) module 55, and an RF filtering module 57.

Within the receiver section 54, the RF filtering module 61 is coupled to filter the inbound RF signal to produce a filtered inbound RF signal. In an embodiment, the RF filtering module 142 is a bandpass filter that may adjust its gain/attenuation, its bandwidth, its roll-off, its corner frequency or frequencies, etc. in accordance with an RF filter control signal. The LNA module 63, which may include one or more low noise amplifiers coupled in series and/or in parallel, is coupled to amplify the filtered inbound RF signal to produce an amplified inbound RF signal. In an embodiment, the LNA module 144 may adjust its gain, its input impedance, its frequency response, its bandwidth, its loading, etc. in accordance with an LNA control signal.

The down conversion module 65, which may include one or more pair of mixers and a combining circuit, is coupled to convert the amplified inbound RF signal into a baseband or near baseband signal (e.g., has a carrier frequency of 0 Hz to a few MHz) based on the receive local oscillation 88. In an embodiment, the down conversion module 65 may adjust its gain, its load, its frequency response, etc. in accordance with a down conversion control signal. The analog filter module 67 is coupled to filter the baseband or near baseband signal to produce an analog representation of the inbound symbol stream 96. In an embodiment, the analog baseband or near baseband filter module 67 may adjust its gain/attenuation, its bandwidth, its roll-off, its corner frequency or corner frequencies, etc. in accordance with the analog filter control signal.

Within the transmitter section 56, the analog filter module 51 is coupled to filter the outbound symbol stream 75 to produce an analog representation of the outbound symbol stream. In an embodiment, the analog filter module 51 may adjust its gain/attenuation, its bandwidth, its roll-off, its corner frequency or corner frequencies, etc. in accordance with an analog filter control signal. The up conversion module 53 is coupled to convert the analog representation of the outbound symbol stream 75 into an up-converted signal based on the transmit local oscillation 86. In an embodiment, the up conversion module 152 may include one or more pair of mixers and a combining circuit and may further adjust its gain, its load, its frequency response, etc. in accordance with an up conversion control signal.

The PA module 55, which may include one or more power amplifiers and/or one or more PA drivers coupled in series and/or in parallel, is coupled to amplify the up-converted signal to produce an amplified outbound RF signal. In an embodiment, the PA module 55 may adjust its gain, its input impedance, its frequency response, its bandwidth, its loading, etc. in accordance with a PA control signal. The RF filtering module 57 is coupled to filter the amplified outbound RF signal to produce the outbound RF signal. In an embodiment, the RF filtering module 57 may adjust its gain/attenuation, its bandwidth, its roll-off, its corner frequency or frequencies, etc. in accordance with an RF filter control signal.

Figure 6:
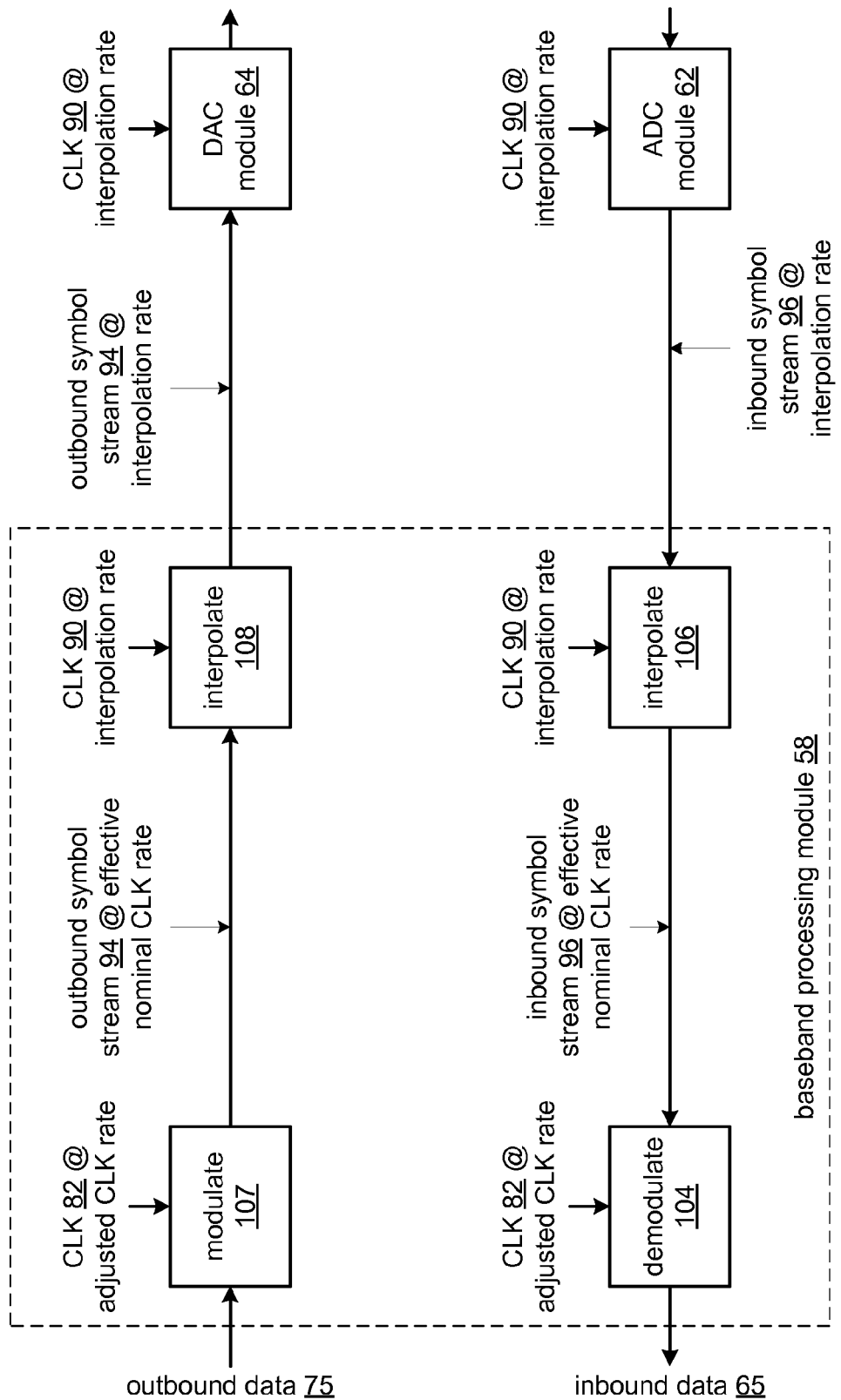
FIG. 6 is a schematic block diagram of an embodiment of a baseband processing module, ADC module, and DAC module in accordance with the present invention.

FIG. 6 is a schematic block diagram of an embodiment of the baseband processing module 58, the ADC module 62, and the DAC module 64. In this embodiment, the baseband processing module 58 includes a demodulation module 104, an interpolation module 106, a modulation module 107, and another interpolation module 108. In this embodiment, the modulation module 107 and the demodulation module 104 are clocked by clock signal 82 having the adjusted clock rate and the interpolation modules 106 and 108, the ADC module 62, and the DAC module 64 are clock by the second clock signal 90 having the interpolation rate.

The modulation module 107, which is clocked by the clock signal 82 having the adjusted clock rate (e.g., 44 MHz), modulates the outbound data 75 to produce the outbound symbol stream 94 at the effective nominal clock rate (e.g., 40 MHz). The modulation performed by the modulation module 107 may include one or more of scrambling, convolution encoding, puncturing, interleaving, quadrature phase shift keying (QPSK) mapping, 8-PSK mapping, Gaussian minimum shift keying (GMSK) mapping, quadrature amplitude modulation (QAM) mapping, frequency shift keying (FSK) mapping, space-time block encoding, space-frequency block encoding, beamforming coefficient processing, and inverse fast Fourier transforming.

To produce the outbound symbol stream 94 at the effective nominal clock rate (e.g., 40 MHz) while being clocked by the clock signal 82 at the adjusted clock rate (e.g., 44 MHz), the modulation module 107 may include circuitry to suppress samples of the outbound symbol stream 94. For example, for every 44 samples generated by the modulation module 107, it suppresses 4 of them such that it outputs 40 samples of the outbound symbol stream 94 for every 44 cycles of the clock signal 82 at the adjusted clock rate of 44 MHz. Alternatively, the modulation module 107 may include digital circuitry to modulate, at the adjusted digital clock rate, the outbound data to produce outbound symbol stream having a rate corresponding to the adjusted digital clock rate, and circuitry to convert the outbound symbol stream having the rate corresponding to the adjusted digital clock rate to the outbound symbol stream having a rate corresponding to the nominal digital clock rate.

The interpolation module 108, which is clocked via the second clock signal 90 at the interpolation rate (e.g., 41 MHz), converts the rate of the outbound symbol stream 94 from the effective nominal clock rate (e.g., 40 MHz) to the interpolation rate. The interpolation module 108 may include interpolation circuitry to interpolate the outbound symbol stream at the nominal clock rate to produce the outbound symbol stream at the interpolation rate. In an embodiment, the interpolation module 108 may be clocked by the adjusted clock rate (e.g., 44 MHz) and includes circuitry to generate the interpolation clock rate (e.g., 41 MHz) from the adjusted clock rate. In another embodiment, the interpolation module 108 may include logic circuitry, a delay line, and a state machine to accommodate the interpolation.

The DAC module 64 is clocked by the second clock signal 90 having the interpolation rate and converts the outbound symbol stream 94 into an analog outbound symbol stream. As such, the outbound data 75 is effectively processed at the nominal clock rate (e.g., 40 MHz) while the digital circuitry is clocked at the adjusted clock rate (e.g., 44 MHz) and/or the interpolated clock rate (e.g., 41 MHz). Note that in one embodiment, the adjusted clock rate and the interpolation clock rate may be the same rate. Further note that in another embodiment, the adjusted clock rate is at a different rate than the interpolation clock rate.

The ADC module 62 is clocked by the second clock signal 90 having the interpolation rate and converts an analog inbound symbol stream into the inbound symbol stream 96 at the interpolation rate. The interpolation module 106, which is clocked via the second clock signal 90 at the interpolation rate (e.g., 41 MHz), converts the rate of the inbound symbol stream 96 from the interpolation rate (e.g., 41 MHz) to the effective nominal clock rate (e.g., 40 MHz). The interpolation module 106 may include interpolation circuitry to interpolate the inbound symbol stream at the interpolation rate to produce the outbound symbol stream at the nominal clock rate. In an embodiment, the interpolation module 106 may be clocked by the adjusted clock rate (e.g., 44 MHz) and includes circuitry to generate the interpolation clock rate (e.g., 41 MHz) from the adjusted clock rate. In another embodiment, the interpolation module 106 suppresses extra samples of the inbound symbol stream 96 to produce the inbound symbol stream at the nominal clock rate. In another embodiment, the interpolation module 106 may include logic circuitry, a delay line, and a state machine to accommodate the interpolation.

The demodulation module 104, which is clocked by the clock signal 82 having the adjusted clock rate (e.g., 44 MHz), demodulates the inbound symbol stream 96 at the effective nominal clock rate (e.g., 40 MHz) to produce the inbound data 65. The demodulation performed by the demodulation module 104 may include one or more of descrambling, decoding, depuncturing, deinterleaving, quadrature phase shift keying (QPSK) demapping, 8-PSK demapping, Gaussian minimum shift keying (GMSK) demapping, quadrature amplitude modulation (QAM) demapping, frequency shift keying (FSK) demapping, space-time block decoding, space-frequency block decoding, beamforming coefficient processing, and fast Fourier transforming.

To produce the inbound data 65 at the effective nominal clock rate (e.g., 40 MHz) while being clocked by the clock signal 82 at the adjusted clock rate (e.g., 44 MHz), the modulation module 104 may include circuitry to suppress samples of the inbound symbol stream 96. For example, for every 44 samples received by the demodulation module 104, it suppresses 4 of them such that it outputs 40 samples of the inbound data 65 for every 44 cycles of the clock signal 82 at the adjusted clock rate of 44 MHz. Alternatively, the demodulation module 104 may include digital circuitry to demodulate, at the adjusted digital clock rate, the inbound symbol stream to produce demodulated inbound data having a rate corresponding to the adjusted digital clock rate, and circuitry to convert the demodulated inbound data having the rate corresponding to the adjusted digital clock rate to the inbound data 65 having a rate corresponding to the nominal digital clock rate.

Figure 7:
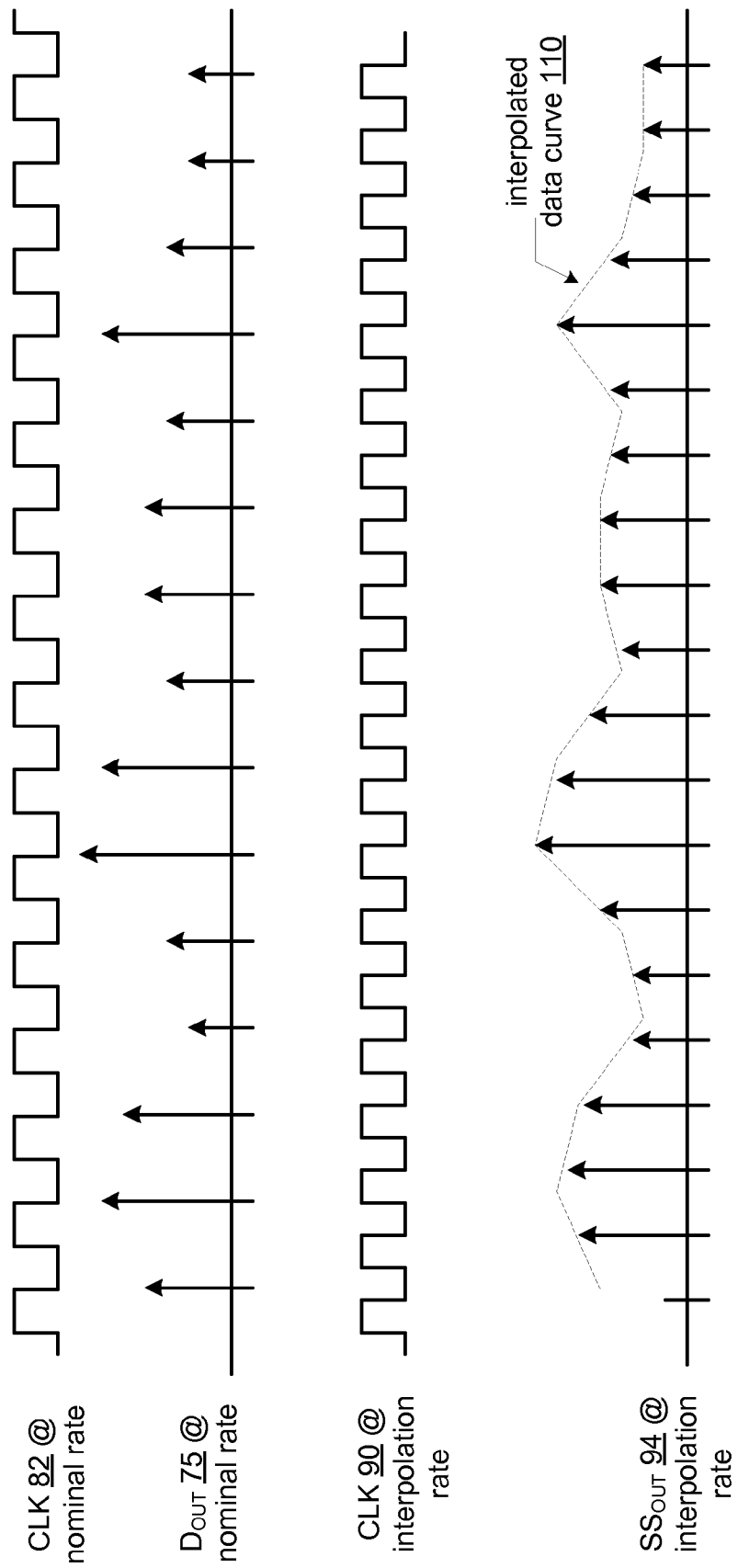
FIGS. 7-10 are diagrams of examples of clock rate adjustment in accordance with the present invention.

FIGS. 7-10 are diagrams of examples of clock rate adjustment performed by the IC(s) 52 of the communication device 50. FIG. 7 is a timing diagram of an example of converting the outbound data 75 at the nominal data rate into the outbound symbol stream 94 at the interpolation rate. FIG. 7 also includes an example of clock signal 82 at the nominal rate and an example of the clock signal 90 at the interpolation rate.

In this example, the outbound data 75 includes a plurality of samples triggered on a falling edge of the clock signal at the nominal rate. This data is interpreted to produce interpolated data curve 110. The interpolation may be done via a linear interpolation between consecutive samples of the outbound data samples or some other interpolation process. The interpolated data 110 is sampled at the interpolation rate to produce the outbound symbol stream 94 at the interpolation rate.

Figure 8:
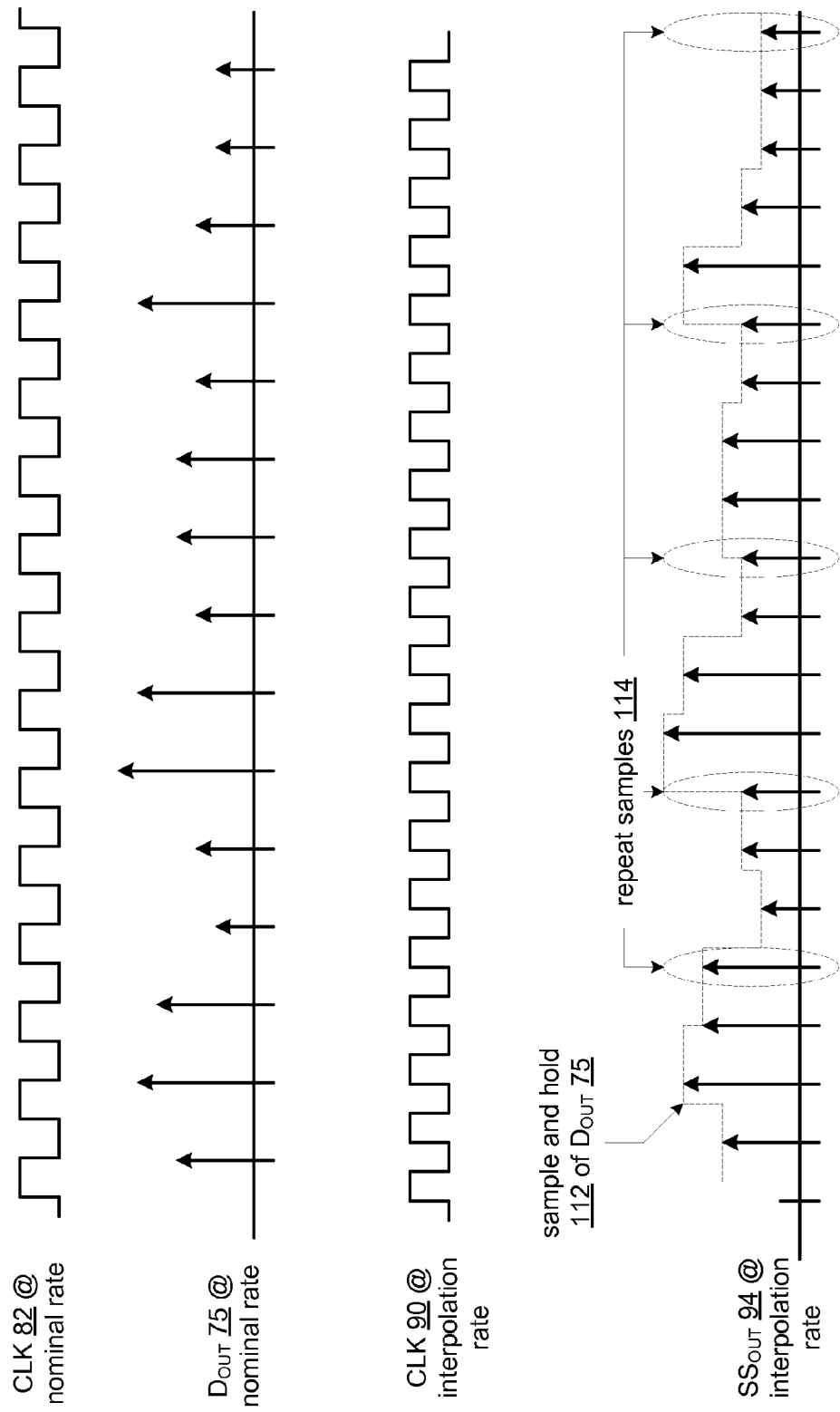

FIG. 8 is a timing diagram of an example of converting the outbound data 75 at the nominal data rate into the outbound symbol stream 94 at the interpolation rate. In this example, the outbound data 75 includes a plurality of samples triggered on a falling edge of the clock signal at the nominal rate. This data is sampled and held to produce sample and hold data 112. The sample and hold data 112 is sampled at the interpolation rate to produce the outbound symbol stream 94 at the interpolation rate, which includes repeat samples 114.

Figure 9:
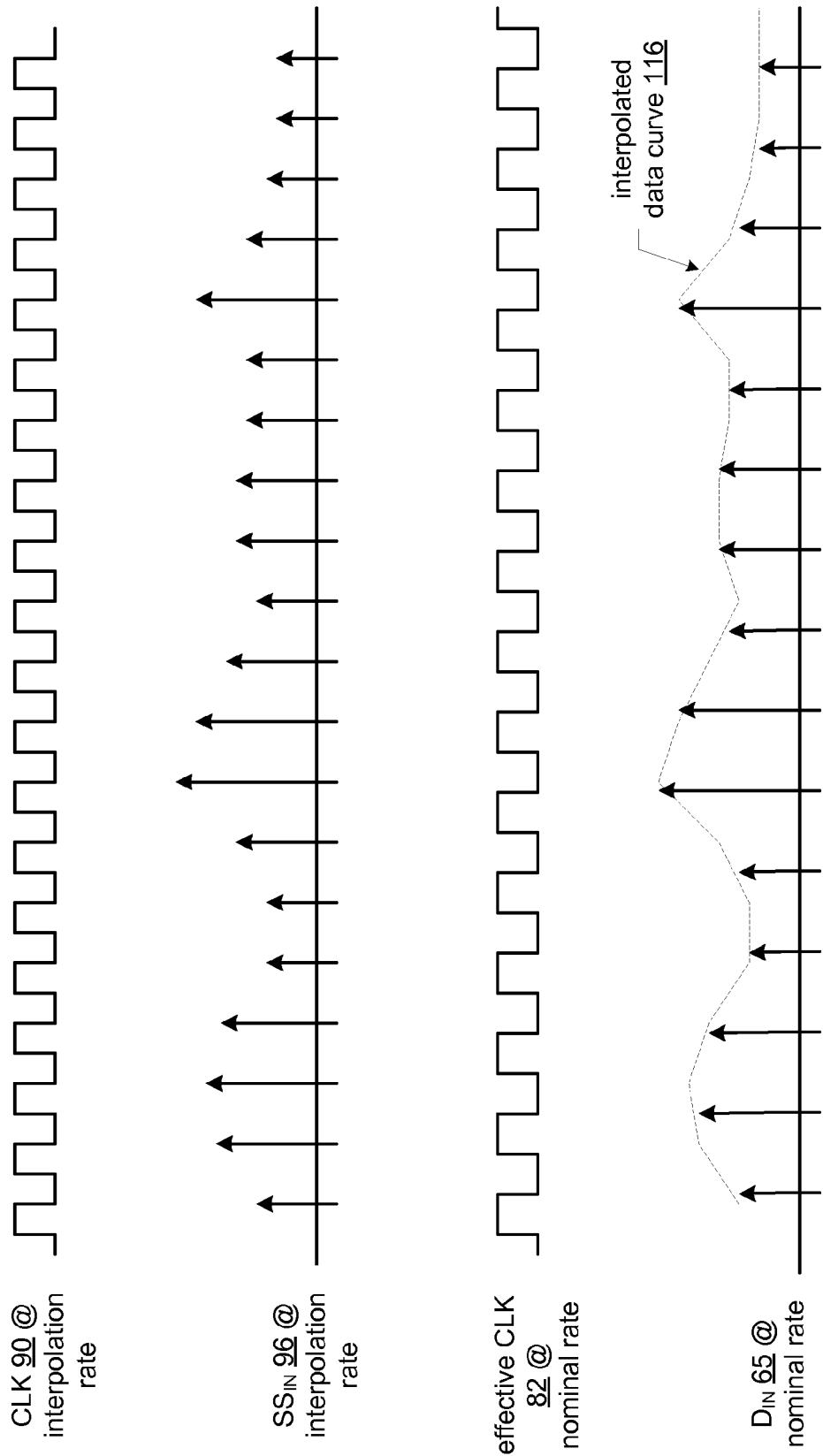

FIG. 9 is a timing diagram of an example of converting the inbound symbol stream 96 at the interpolation rate into the inbound data 65 at the nominal clock rate. In this example, the inbound symbol stream 96 includes a plurality of samples at the interpolation rate. This signal is interpreted to produce an interpolated data curve 116, which may be done via a linear interpolation between consecutive samples of the inbound symbol stream samples or some other interpolation process. The interpolated data curve 116 is sampled at the nominal clock rate to produce the inbound data 65. Note that the nominal clock rate may be derived from the adjusted clock rate using digital logic circuitry. An example of such circuitry is provided in FIG. 11.

Figure 10:
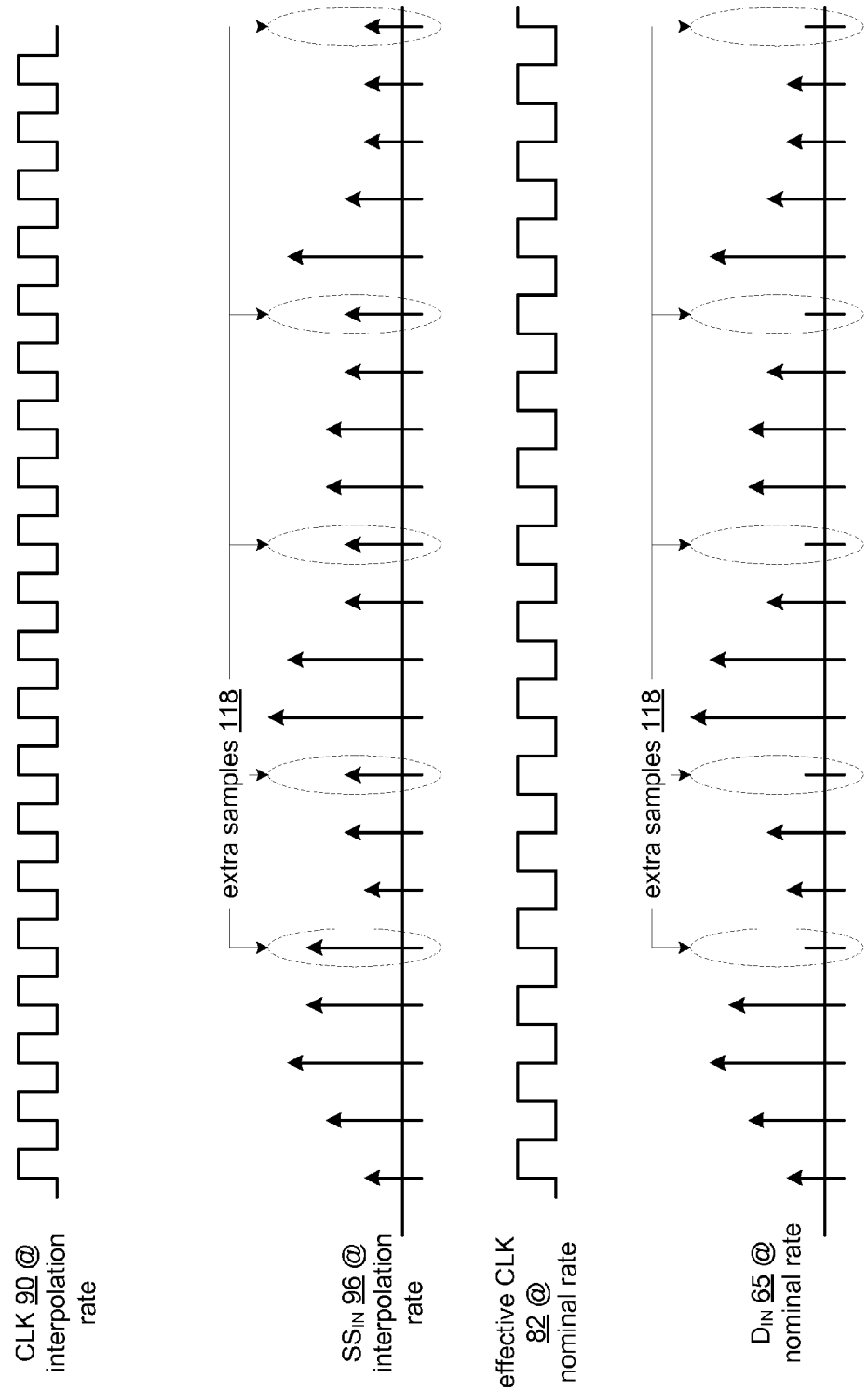

FIG. 10 is a timing diagram of an example of converting the inbound symbol stream 96 at the interpolation rate into the inbound data 65 at the nominal clock rate. In this example, the inbound symbol stream 96 includes a plurality of samples at the interpolation rate and, with respect to the nominal clock rate, includes extra samples 118. The inbound data 65 at the nominal clock rate is produced by suppressing the extra samples 118.

Figure 11:
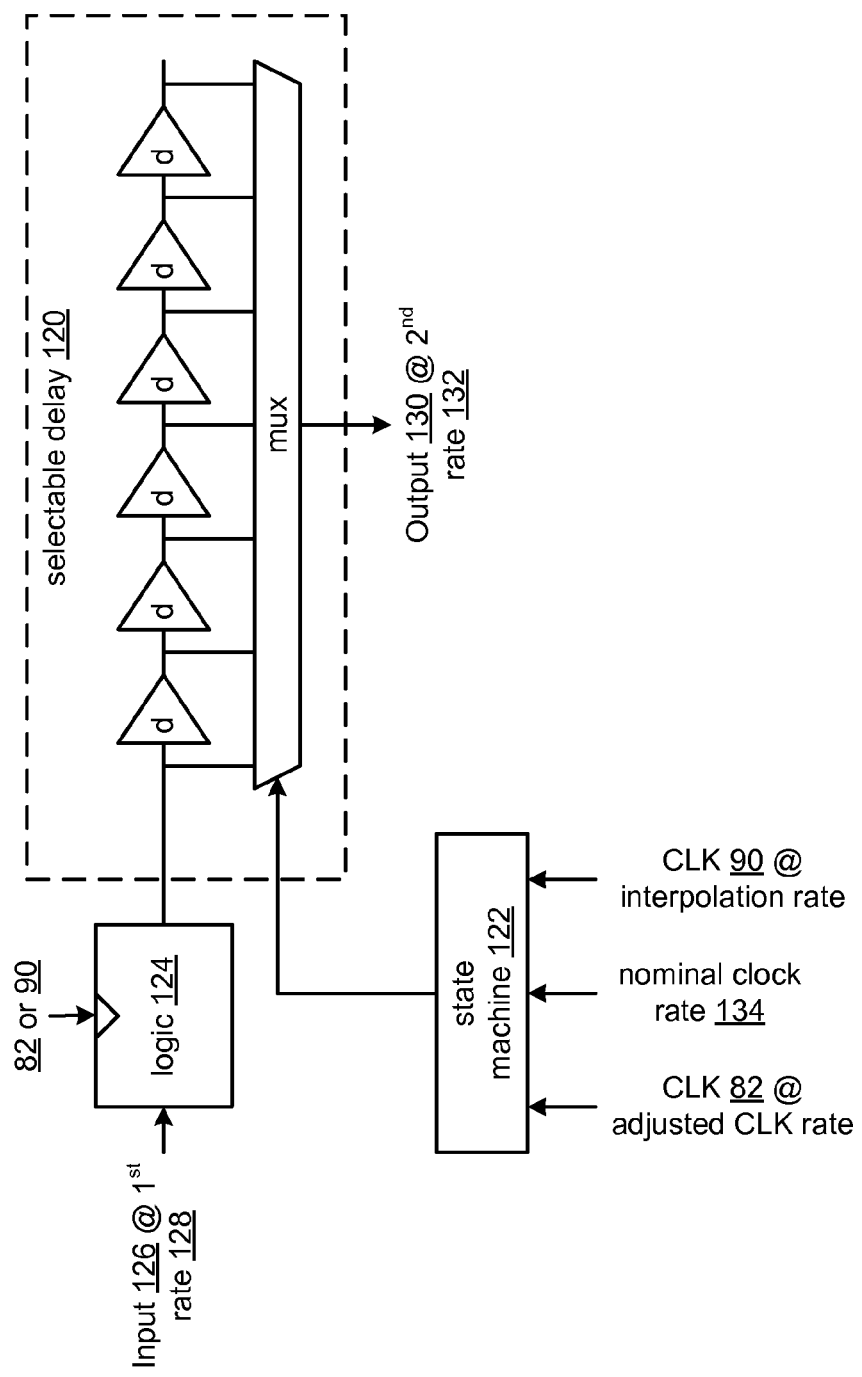
FIG. 11 is a schematic block diagram of an embodiment of a rate compensation circuit in accordance with the present invention.

FIG. 11 is a schematic block diagram of an embodiment of a rate compensation circuit may be included in the modulation module 107, the interpolation module 108, the interpolation module 106, and/or the demodulation module 104 to facilitate the clock rate change between the nominal rate and the interpolation rate. As shown, the rate compensation circuit includes a selectable delay 120, a state machine 122, and logic 124. The logic 124 performs the corresponding function of the module including the rate compensation circuit. For example, the logic 124 may be modulation circuitry, demodulation circuitry, sample and hold circuitry, interpolation circuitry, suppression circuit, etc.

The logic 124 is clocked via the first or second clock signals 82 or 90 (e.g., at the adjusted clock rate or the interpolation clock rate) to process an input 128, which has a first rate. For example, the input 128 may be the outbound data 75 at the nominal clock rate, the outbound symbol stream at the nominal clock rate, the inbound symbol stream at the interpolation rate, or the inbound symbol stream at the nominal data rate. The logic 124 provides its output, which has a rate corresponding to the rate of the first or second clock signal 82 or 85, to the selectable delay 120.

The selectable delay 120 includes a plurality of delay elements (d). The output of each delay is provided to the multiplexer (mux), which is controlled via the state machine 122. In this instance, the multiplexer outputs one of the delayed representations of the logic output based on the control signal provided by the state machine to produce an output 130 at a second rate 132. For example, the output 130 may be inbound data 65, the inbound symbol stream at the nominal rate, or the outbound symbol stream at the nominal rate.

The state machine 122 generates the control signal based on the nominal clock rate 134 and the first clock 82 at the adjusted clock rate or the second clock 90 at the interpolation clock rate. For example, if the logic output has a rate of 41 MHz, it is providing a sample every 24.4 nano seconds. In furtherance of this example, assume that the second rate 132 of the output is desired to be 40 MHz, which has a period of 25 nano seconds. In this example, the first sample is delayed by 0.6 nano seconds, the second sample is delayed by 1.2 nano seconds, the third sample is delayed by 1.8 nano seconds, etc. The forty-first sample is skipped or interpolated with the first sample of the next 41 samples to account for the difference in timing.

Figure 12:
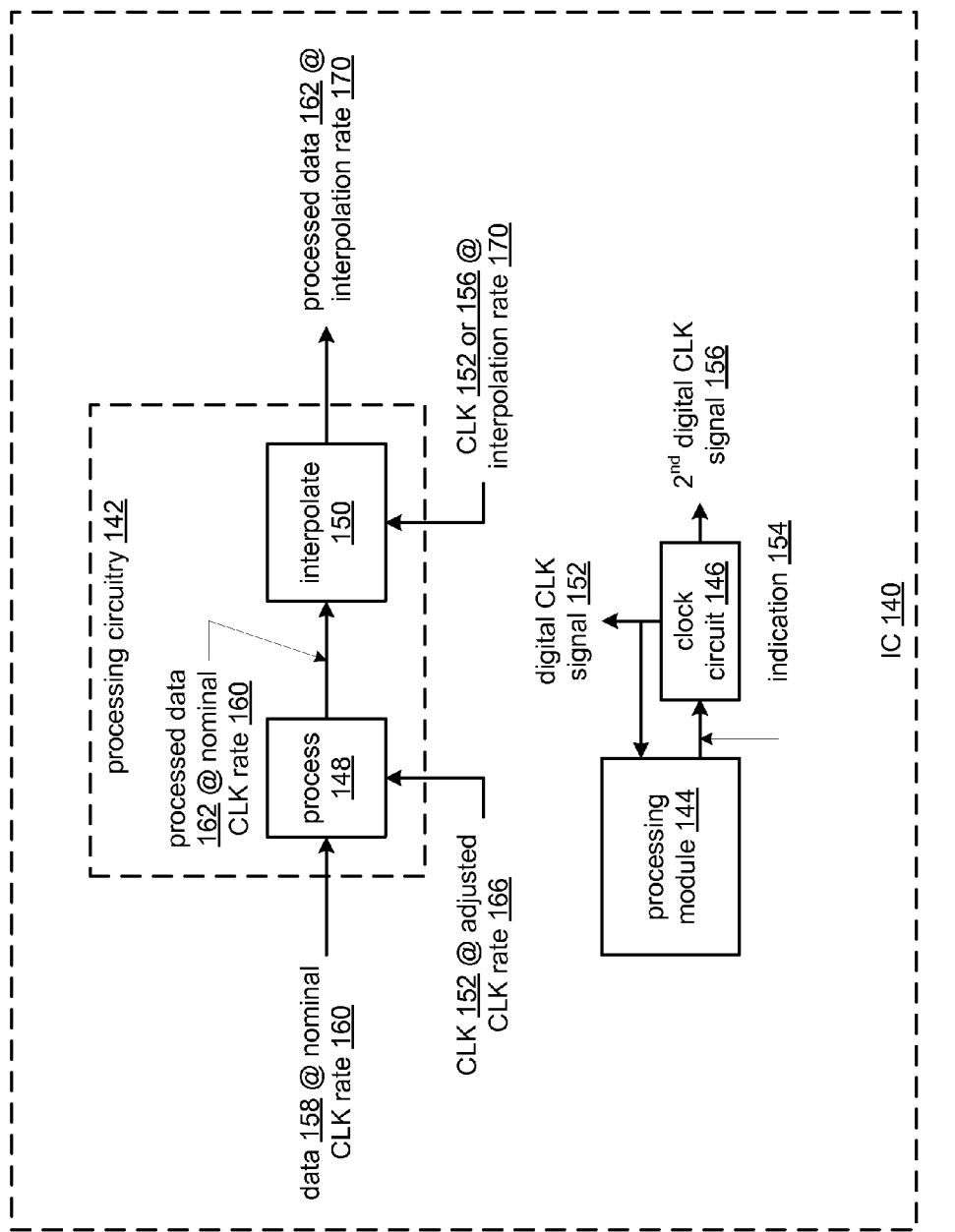
FIG. 12 is a schematic block diagram of an embodiment of an integrated circuit in accordance with the present invention.

FIG. 12 is a schematic block diagram of an embodiment of an integrated circuit 140 that includes processing circuitry 142, a processing module 144, and a clock circuit 146. The processing circuitry 142 includes a process module 140 and an interpolate module 150. The process module 140 may perform any function that can be implemented using digital circuitry on an integrated circuit. Such a function includes, but is not limited to, arithmetic logic unit, digital signal processing, digital portion of an ADC, digital portion of a DAC, baseband processing within a wireless communication device, microprocessor functionality, and memory read or write functionality.

The clock circuit 146, which may be implemented similarly to clock circuit 80, is coupled to produce a digital clock signal 152. The processing module 144, which may be a processing device as previously discussed, is coupled to determine whether a harmonic component of the digital clock signal having a nominal digital clock rate is within the frequency passband. Refer to FIG. 4 for an example of such a determination. When the harmonic component of the digital clock signal is within the frequency passband, the processing module 144 provides an indication 154 to the clock circuit 146 to adjust the rate of the digital clock signal 152 from the nominal digital clock rate to an adjusted digital clock rate, where harmonic components of the digital clock signal having the adjusted digital clock rate are outside of the frequency passband. Refer to FIG. 5 for an example of the harmonic components outside of the frequency passband.

The processing circuitry 142 is coupled to receive data 158 at the nominal digital clock rate 160. The processing circuitry 142 processes, at the adjusted digital clock rate 166, the data 158 to produce processed data 162 having a rate corresponding to the nominal digital clock rate 160. The processing circuitry 142 then interpolates, at an interpolation rate 170, the processed data 162 to produce interpolated processed data 162 having a rate corresponding to the interpolation rate 170. In one embodiment, the interpolation rate 170 corresponding to the adjusted digital clock rate 166.

In another embodiment, the clock circuit 146 is coupled to produce a second digital clock signal 156. In this embodiment, the clock circuit 146 may generate the first clock signal 156 to have the adjusted clock rate 166 and may generate the second clock signal 156 to have the interpolation rate 170 in accordance with the indication 154 provided by the processing module 144. The processing module 144 generates the indication 154 such that harmonics of the adjusted clock rate 166 and of the interpolation clock rate 170 are not within the frequency passband. Note that the adjusted digital clock rate may be at a higher rate than the nominal digital clock rate.

Figure 13:
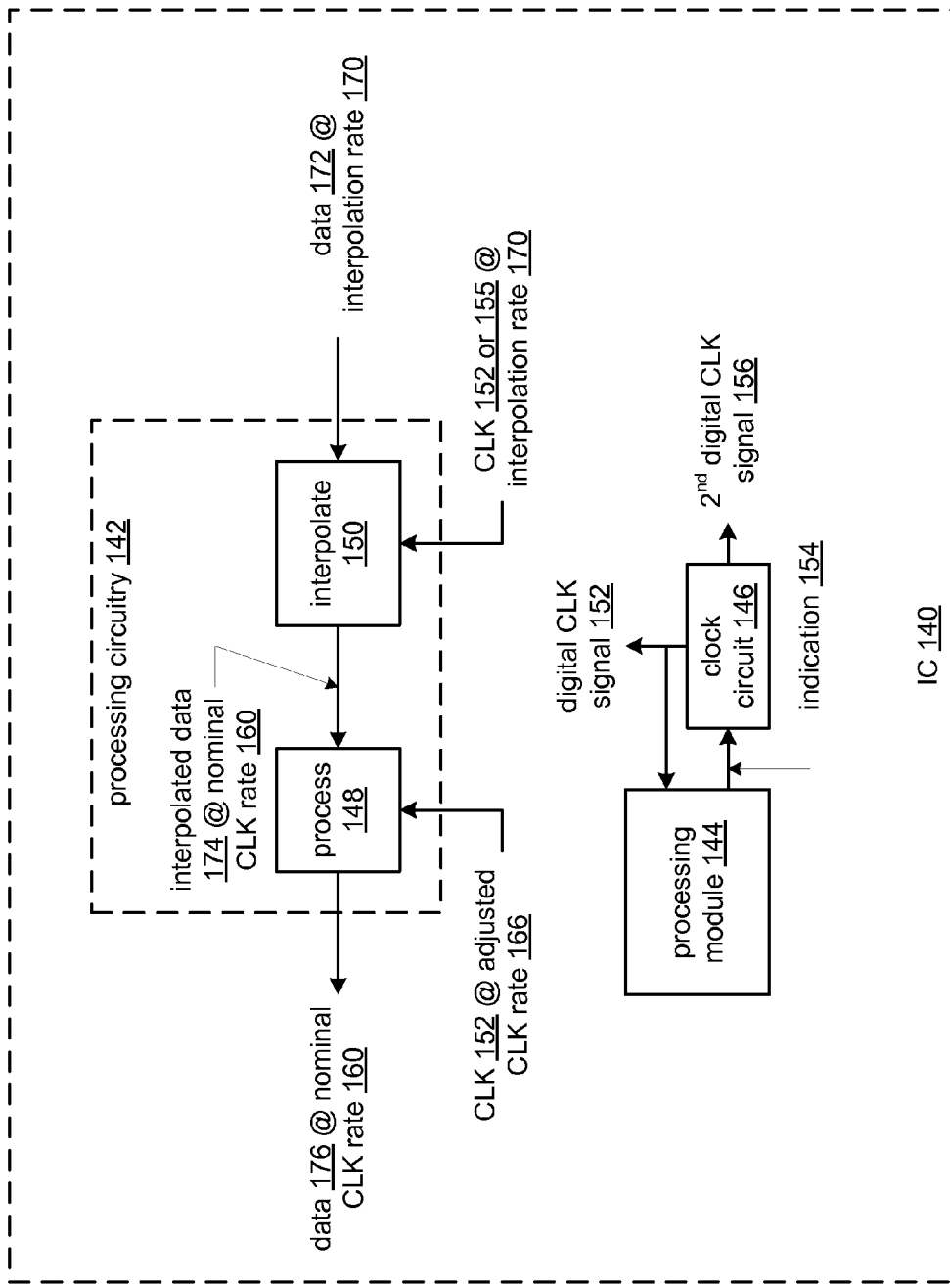
FIG. 13 is a schematic block diagram of another embodiment of an integrated circuit in accordance with the present invention.

FIG. 13 is a schematic block diagram of another embodiment of an integrated circuit 140 that includes processing circuitry 142, a processing module 144, and a clock circuit 146. The processing circuitry 142 includes a process module 140 and an interpolate module 150. The process module 140 may perform any function that can be implemented using digital circuitry on an integrated circuit. Such a function includes, but is not limited to, arithmetic logic unit, digital signal processing, digital portion of an ADC, digital portion of a DAC, baseband processing within a wireless communication device, microprocessor functionality, and memory read or write functionality.

The clock circuit 146, which may be implemented similarly to clock circuit 80, is coupled to produce a digital clock signal 152. The processing module 144, which may be a processing device as previously discussed, is coupled to determine whether a harmonic component of the digital clock signal having a nominal digital clock rate is within the frequency passband. Refer to FIG. 4 for an example of such a determination. When the harmonic component of the digital clock signal is within the frequency passband, the processing module 144 provides an indication 154 to the clock circuit 146 to adjust the rate of the digital clock signal 152 from the nominal digital clock rate to an adjusted digital clock rate, where harmonic components of the digital clock signal having the adjusted digital clock rate are outside of the frequency passband. Refer to FIG. 5 for an example of the harmonic components outside of the frequency passband.

The processing circuitry 142 is coupled to receive data 172 at the interpolation rate 170. The processing circuitry 142 interpolates 170, at the interpolation rate 170, the data 172 to produce interpolated data 174 having a rate corresponding to the nominal clock rate. The processing circuitry 142 then processes 148, at the adjusted digital clock rate 166, the interpolated data 174 to produce recovered data 176 having a rate corresponding to the nominal digital clock rate 160. In one embodiment, the interpolation rate 170 corresponding to the adjusted digital clock rate 166.

In another embodiment, the clock circuit 146 is coupled to produce a second digital clock signal 156. In this embodiment, the clock circuit 146 may generate the first clock signal 156 to have the adjusted clock rate 166 and may generate the second clock signal 156 to have the interpolation rate 170 in accordance with the indication 154 provided by the processing module 144. The processing module 144 generates the indication 154 such that harmonics of the adjusted clock rate 166 and of the interpolation clock rate 170 are not within the frequency passband. Note that the adjusted digital clock rate may be at a higher rate than the nominal digital clock rate.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A circuit comprises:
   a clock circuit for producing a digital clock signal; and
   processing circuitry clocked by the digital clock signal and operating to:
      receive data at a nominal digital clock rate of the digital clock signal;
      process, at an adjusted digital clock rate of the digital clock signal, the data to produce processed data having a rate corresponding to the nominal digital clock rate; and
      interpolate, at an interpolation rate of the digital clock signal, the processed data to produce interpolated processed data having a rate corresponding to the interpolation rate;
      wherein harmonic components of the digital clock signal having the adjusted digital clock rate do not interfere with the operation of at least a portion of the circuit.

2. The circuit of claim 1, further comprising:
   a processing module operating to:
      determine that the harmonic component of the digital clock signal interferes with the operation of the at least a portion of the circuit by determining whether the harmonic component of the digital clock signal is within a frequency passband; and when the harmonic component of the digital clock signal is within the frequency passband, provide an indication to the clock circuit to adjust the rate of the digital clock signal from the nominal digital clock rate to the adjusted digital clock rate, wherein harmonic components of the digital clock signal having the adjusted digital clock rate are outside of the frequency passband.

3. The circuit of claim 2, wherein the processing circuitry comprises:
a digital modulation module operating to modulate, at the adjusted digital clock rate, the data at the nominal digital clock rate to produce modulated data having a rate corresponding to the nominal digital clock rate;
an interpolation module operating to interpolate, at the interpolation rate, the modulated data to produce interpolated modulated data having a rate corresponding to the interpolation rate; and
a digital to analog conversion module operating to convert the interpolated modulated data into analog modulated data, wherein a digital portion of the digital to analog conversion module is clocked in accordance with the interpolation rate.

4. The circuit of claim 3, wherein the digital modulation module comprises:
digital modulation circuitry operating to modulate, at the adjusted digital clock rate, the data to produce modulated data having a rate corresponding to the adjusted digital clock rate; and
rate adjusting circuitry operating to convert the modulated data having the rate corresponding to the adjusted digital clock rate into the modulated data having the nominal digital clock rate.

5. The circuit of claim 3 further comprises:
an analog filter module operating to filter the analog modulated data to produce filtered modulated data;
an up-conversion module operating to convert the filtered modulated data into an upconverted signal;
a power amplifier module operating to amplify the upconverted signal to produce a transmit radio frequency (RF) signal having a carrier frequency within the frequency passband; and
an RF filtering module operating to filter the transmit RF signal to produce an outbound RF signal.

6. The circuit of claim 1 comprises:
the clock circuit operating to produce a second digital clock signal at the interpolation rate, wherein harmonic components of the second digital clock signal having the interpolation rate do not interfere with the operation of the at least a portion of the circuit.

7. The circuit of claim 1 comprises:
the adjusted digital clock rate is at a higher rate than the nominal digital clock rate.

8. The circuit of claim 1 comprises:
the interpolation rate corresponding to the adjusted digital clock rate.

9. The circuit of claim 1 comprises:
an integrated circuit (IC) substrate that supports the clock circuit and the processing circuitry.

10. A circuit comprises:
a clock circuit operating to produce a digital clock signal; and
processing circuitry clocked at the digital clock signal and operating to:
receive data at an interpolation rate of the digital clock signal;
interpolate, in accordance with the interpolation rate, the data to produce interpolated data having a rate corresponding to a nominal digital clock rate of the digital clock signal; and
process, in accordance with an adjusted digital clock rate of the digital clock signal, the interpolated data to produce processed data having a rate corresponding to the nominal digital clock rate;
wherein harmonic components of the digital clock signal having the adjusted digital clock rate do not interfere with the operation of the at least a portion of the circuit.

11. The circuit of claim 10, further comprising:
a processing module operating to:
determine that the harmonic component of the digital clock signal interferes with the operation of the at least a portion of the circuit by determining whether the harmonic component of the digital clock signal is within a frequency passband; and
when the harmonic component of the digital clock signal is within the frequency passband, provide an indication to the clock circuit to adjust the rate of the digital clock signal from the nominal digital clock rate to the adjusted digital clock rate, wherein harmonic components of the digital clock signal having the adjusted digital clock rate are outside of the frequency passband.

12. The circuit of claim 11, wherein the processing circuitry comprises:
an analog to digital conversion module operating to convert analog modulated data into the data at the interpolation rate, wherein a digital portion of the analog to digital conversion module is clocked in accordance with the interpolation rate;
an interpolation module operating to interpolate, at the interpolation rate, the data at the interpolation rate to produce interpolated modulated data having a rate corresponding to the nominal digital clock rate; and
a digital demodulation module operating to demodulate, at the adjusted digital clock rate, the interpolated modulated data at the nominal digital clock rate to produce recovered data having a rate corresponding to the nominal digital clock rate.

13. The circuit of claim 12, wherein the digital demodulation module comprises:
digital demodulation circuitry coupled to demodulate, at the adjusted digital clock rate, the interpolated modulated data to produce demodulated data having a rate corresponding to the adjusted digital clock rate; and
rate adjusting circuitry coupled to convert the demodulated data having the rate corresponding to the adjusted digital clock rate into the recovered data having the nominal digital clock rate.

14. The circuit of claim 12, wherein the interpolation module comprises:
sampling circuitry to sample the data at the interpolation rate to produce sampled data; and
rate adjusting circuitry operating to convert the sampled data into the interpolated modulated data having the rate corresponding to the nominal digital clock rate.

15. The circuit of claim 12 further comprises:
a radio frequency (RF) filtering module operating to filter an inbound RF signal to produce a filtered inbound RF signal;

a low noise amplifier module operating to amplify the filtered inbound RF signal to produce an amplified inbound RF signal having a carrier frequency within the frequency passband;

an down-conversion module operating to convert the amplified inbound RF signal into modulated data; and an analog filter module operating to filter the modulated data to produce the analog modulated data.

16. The circuit of claim 10 comprises:

the clock circuit coupled to produce a second digital clock signal, wherein harmonic components of the second digital clock signal having the interpolation rate do not interfere with the operation of the at least a portion of the circuit, not interfere with the operation of at least a portion of the circuit.

17. The circuit of claim 10 comprises:

the interpolation rate corresponding to the adjusted digital clock rate.

18. The circuit of claim 10 comprises:

the adjusted digital clock rate is at a higher rate than the nominal digital clock rate.

19. The circuit of claim 10 comprises:

an integrated circuit (IC) substrate that supports the clock circuit and the processing circuitry.

20. A radio frequency (RF) circuit comprises:

a clock circuit for producing a digital clock signal;

a transmitter section for converting an analog outbound symbol stream into an outbound RF signal;

a digital to analog conversion module for converting a digital outbound symbol stream into the analog outbound symbol stream; and processing circuitry clocked by the digital clock signal and operating to:

receive outbound data at a nominal digital clock rate of the digital clock signal;

modulate, at an adjusted digital clock rate of the digital clock signal, the outbound data to produce modulated outbound data having a rate corresponding to the nominal digital clock rate; and interpolate, at an interpolation rate of the digital clock signal, the modulated outbound data to produce the digital outbound symbol stream having a rate corresponding to the interpolation rate;

wherein harmonic components of the digital clock signal having the adjusted digital clock rate do not interfere with the operation of at least a portion of the RF circuit.

* * * * *